United States Patent
Kawamura et al.

(10) Patent No.: US 8,243,575 B2
(45) Date of Patent: Aug. 14, 2012

(54) OPTICAL HEAD

(75) Inventors: Tomoto Kawamura, Yokohama (JP);
Hiromi Kita, Hiratsuka (JP); Hiroshi Ogasawara, Yokohama (JP); Michio Hatagi, Chigasaki (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 12/955,119

(22) Filed: Nov. 29, 2010

(65) Prior Publication Data

US 2011/0182164 A1    Jul. 28, 2011

(30) Foreign Application Priority Data

Jan. 25, 2010   (JP) ................................ 2010-012754

(51) Int. Cl.
*G11B 7/00*   (2006.01)
(52) U.S. Cl. ................................. 369/112.28
(58) Field of Classification Search ............... 369/44.23, 369/44.37, 94, 112.28, 112.29, 112.09, 112.05
See application file for complete search history.

(56) References Cited

U.S. PATENT DOCUMENTS

| | | | | |
|---|---|---|---|---|
| 5,132,950 | A * | 7/1992 | Sato et al. | 369/112.28 |
| 5,537,384 | A * | 7/1996 | Lee et al. | 369/112.21 |
| 5,875,167 | A * | 2/1999 | Katayama | 369/94 |
| 6,108,283 | A * | 8/2000 | Fujita et al. | 369/44.23 |
| 2004/0114495 | A1 | 6/2004 | Kim et al. | |
| 2005/0007906 | A1 * | 1/2005 | Horinouchi et al. | 369/44.37 |
| 2005/0199778 | A1 | 9/2005 | Kadowaki et al. | |
| 2008/0049586 | A1 * | 2/2008 | Ishika | 369/112.24 |
| 2009/0040909 | A1 * | 2/2009 | Anzai et al. | 369/112.24 |

FOREIGN PATENT DOCUMENTS

| | | |
|---|---|---|
| JP | 07-021580 | 1/1995 |
| JP | 07-058414 | 3/1995 |
| JP | 07-220299 | 8/1995 |
| JP | 08-063818 | 3/1996 |
| JP | 08-147742 | 6/1996 |
| JP | 08-273189 | 10/1996 |
| JP | 2004-134056 | 4/2004 |
| JP | 2004-281026 | 10/2004 |

* cited by examiner

*Primary Examiner* — Thang Tran
(74) *Attorney, Agent, or Firm* — Antonelli, Terry, Stout & Kraus, LLP.

(57) ABSTRACT

A thin-type optical head, smaller in optic mounting spaces comprising to the conventional one, in an optic system enabling with BD including a 2-layers BD, DVD an CD, comprises a light source, for emit a light beam therefrom; an optical branch element for penetrating a predetermined amount of lights, therethrough, of an incident light beam thereon, and to reflecting remaining amount of lights thereupon; a light focusing element for focusing the light beam upon an optical information recording medium; a photo detector for receiving the light beam reflecting upon the optical information recording medium; and an optical path converter element for converting an angle of an optical path, on which the light beam propagates, wherein the optical path converter element is disposed on an optical path of the light beam between the optical branch element and the photo detector, or between the optical branch element and the light source, and has an incident surface, upon which the light beam enters, and an emission surface, from which the light beams emits, so that the light beam reflects at least two (2) times within the optical path converter element, during time when passing through between the incident surface and the emission surface.

10 Claims, 7 Drawing Sheets

OPTICAL HEAD

This application relates to and claims priority from Japanese Patent Application No. 2010-012754 filed on Jan. 25, 2010, the entire disclosure of which is incorporated herein by reference.

BACKGROUND OF THE INVENTION

The present invention relates to an optical head for recording or reproducing information onto/from an optical information recording medium.

In the following Patent Documents 1, 2 and 3 is described an optical head.

In the Patent Document 1 is made the following description: an object is "to provide an optical pickup enabling to deal with plural numbers of recording media, each having a different recording density, such as, CD, DVD and a next generation DVD, by means of plural numbers of objective lenses and a light source of plural numbers of wavelengths", and "Tilt of the objective lens, generating when manufacturing the optical pickup, is compensated with driving of an object lens actuator. This actuator can be made lightweight than the conventional operation portion having plural numbers of objective lenses, by dividing magnetic circuits provided in the operation portion into, i.e., a focusing direction and a tracking direction. Also, disposing the plural numbers of objective lenses by taking the difference of operating distances into the consideration thereof, it is possible to prevent the objective lens having a short operating distance from touching on the recording medium."

Also, in the Patent Document 2 is made the following description: "With using a tracking error signal producing means for producing a tracking error signal, i.e., a signal to be used for control of irradiating a beam on a desired track, wherein said light detecting means has plural numbers of light receiver portions, said plural numbers of beams irradiate different positions in the direction perpendicular to the track, and said tracking error signal producing means produces a push-pull signal by conducting differential operation on the signals outputted from said light receiver portions; thereby controlling the signal obtained from said plural numbers of beams.", and "With such the structure as was mentioned above, it is possible to obtain a preferable TE signal, which is less influenced by a stray light upon reflection from a protection layer of the information recording medium, and thereby providing an optical head device for enabling to recording/reproducing of information with a high reliability.", and "Also, the reflection surface generating the stray light should not be restricted to the surface of a transparent substrate, but in case where the optical recording medium has plural numbers of recording surfaces thereon, the stray light is generated from other than the recording surface recording or reproducing the information thereon/from. In such case, the present invention is also effective."

PRIOR ART DOCUMENTS

Patent Documents

[Patent Document 1] Japanese Patent Laying-Open No. 2004-134056 (2004);
[Patent Document 2] Japanese Patent Laying-Open No. 2004-281026 (2004); and
[Patent Document 3] Japanese Patent Laying-Open No. Hei 8-63818 (1996).

BRIEF SUMMARY OF THE INVENTION

An optical information recording medium includes a magneto-optical (MO) disk, and an optical disc, etc. In particular, among the optical discs, a CD (Compact Disc), a DVD (Digital Versatile Disc) and a BD (Blu-ray Disc) are regulated or standardized.

On those optical discs are made different regulations or standards, respectively, in particular, such as, a wavelength of semiconductor laser to be used, NA of objective lens, thickness of cover glass of the optical disc, etc., for example. There is alight focusing element for focusing a light beam on an information surface of the optical disc. In the optical head, the objective lens is used as the light focusing element. Within the optical head for enabling three (3) pieces or kinds of discs, such as, the CD, the DVD and BD, for example, and in recent years, studies are made on an objective lens compatible three (3) optical discs, for achieving a common use thereof; however, because of maintaining WD (Working Distance), i.e., a gap, between the optical disc and the objective lens, it is impossible for the objective lens compatible with 3 kinds of optical discs to avoid large-size. Also, the objective lens compatible with 3 wavelengths has a drawback that a light transmission or penetrating efficiency is low, and it has a barrier of being applied onto a recording-type optical disc.

For this reason, in the optical head is commonly applied a two (2) objective lens method of using two (2) pieces of objective lenses, i.e., a two (2) wavelength objective lens for the DVD and the CD, and a BD objective lens for exclusive use of BD, and this is shown in the Patent Document 1 mentioned above and so on.

Also, among those of BD, there is a two (2) layer BD having two (2) pieces of information surfaces. When reproducing this two (2) layer BD, in particular, when reproducing a predetermined information surface, the stray light is generated from another information surface. This is called, "inter-layer crosstalk". The inter-layer crosstalk results into, in particular, a disturbance of a servo signal. The servo signal means a signal for controlling a light focusing spot at a predetermined position on a predetermined information surface. A countermeasure for the inter-layer crosstalk is disclosed, for example, in the Patent Document 2 mentioned above. In the Patent Document 2, the countermeasure is made in such that the inter-layer crosstalk will not enter upon a light receiving surface of the light detector for producing the servo signal.

For example, the optical head, being compatible with the BD, including the two (2) layer BD, the DVD and the CD, can be achieved by combining the optical structure shown in the Patent Document 1 and the optical head shown in the Patent Document 2.

However, within a thin-type optical head for use in a notebook-type personal computer and/or a portable drive, it cannot be installed within an outer case of the thin-type optical head, by only simply combining them, because an optical install space is small.

Then, according to the present invention, an object thereof is to achieve a thin-type optical head, having the optical install space being smaller than that of the conventional one, in an optic system, such as, the thin-type optical head being compatible with the BD, including the two (2) layer BD, the DVD and the CD, for example.

Such object as was mentioned above can be accomplished, by means of an optical head, having such structure as described in the pending patent claims, for example. In more details thereof, there is provided an optical head, comprising: a light source, which is configured to emit a light beam; an optical branch element, which is configured to penetrate a predetermined amount of lights, therethrough, of an incident light beam thereon, and to reflecting remaining amount of lights thereupon; a light focusing element, which is configured to focus said light beam upon an optical information recording medium; a photo detector, which is configured to receive said light beam reflecting upon said optical information recording medium; and an optical path converter element, which is configured to convert an angle of an optical path, on which said light beam propagates, wherein said optical path converter element is disposed on an optical path of said light beam between said optical branch element and said photo detector, or between said optical branch element and said light source, and has an incident surface, upon which said light beam enters, and an emission surface, from which said light beams emits, so that said light beam reflects at least two (2) times within said optical path converter element, during time when passing through between said incident surface and said emission surface.

According to the present invention, it is possible to obtain an optical head, being small in sizes thereof, comparing to that of the conventional art.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings; however, the present invention should not be restricted to those embodiments.

Embodiment 1

Detailed explanation will be given on an embodiment 1, according to the present invention, by referring to drawings attached herewith. Herein, the explanation will be made with assumption that, as an optical disc, it is able to record onto or reproduce from a two (2) layer BD (hereinafter, "2-layers BD". Of course, not limited only to the 2-layer BD, but it does not matter that it may be an optical disc of BD having one (1) layer, or three (3) layers or more than that, or the DVD or the CD.

Figure 1:
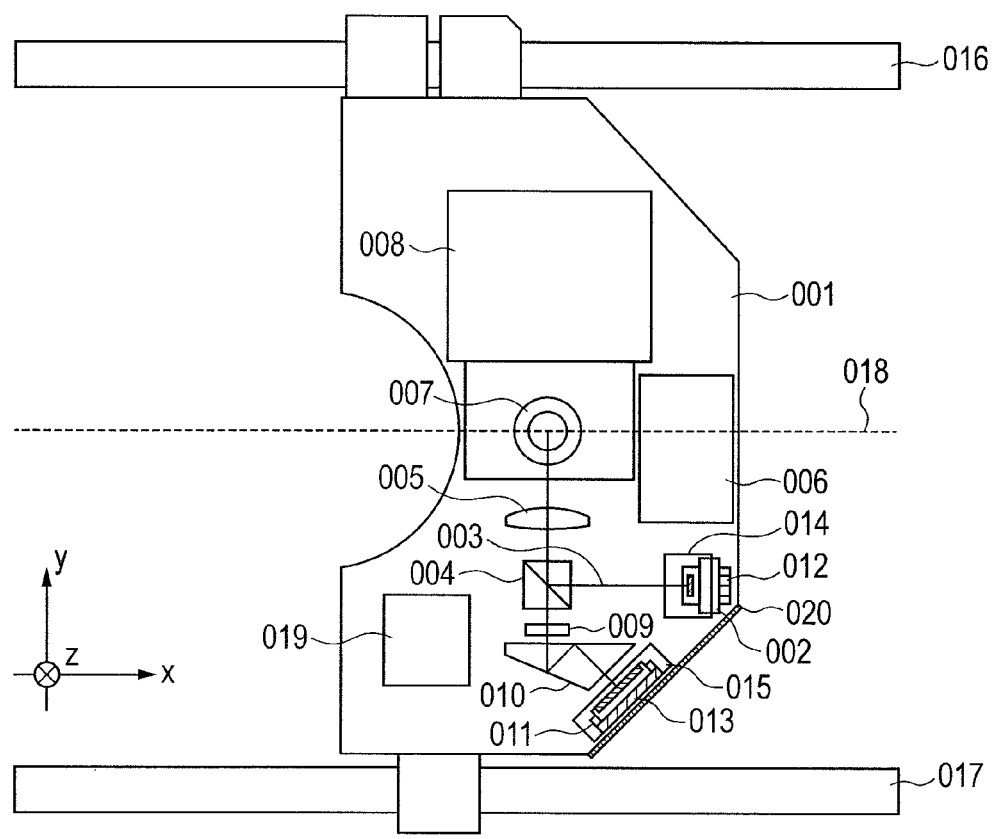
FIG. 1 is a view for showing the structure of an optical head, according to an embodiment 1 of the present invention.

FIG. 1 is a view for showing an outline of the structures of an optical head 001, according to the embodiment 1. The figure shows the optical head 001 in the condition of seeing from the optical disc, i.e., the 2-layers BD side thereof (in the positive direction from the negative direction, on a paper surface Z).

A light beam emits from a light source 002 in the form of the divergent pencil of rays. For conducting the recording or reproducing of information onto/from BD, in general, it is common to use a semiconductor laser having a wavelength band from 395 nm to 415 nm, and it is assumed that the light beam of about 405 in the wavelength emit from the light source 002. Further, a solid line 003 in the figure shows a route of the light beam emitting from the light source 002.

The light beam emitting from the light source 002 enters onto an optical branch element 004. The optical branch element is an element for passing a predetermined amount of the incident light beam therethrough, while reflecting the remaining thereof there upon. The optical branch element can be achieved by using a flat mirror or a prism, or a polarizing prism, etc.

The light beam reflecting on the optical branch element 004 is converted into light beams nearly in parallel with, by means of a collimate lens 005. A spherical aberration correction mechanism 006 is a mechanism for driving the collimate lens 005 in a direction of an optical axis (in y-direction on the paper surface), and it can be achieved by using an electromagnetic motor or a piezoelectric element, etc.

The BD generates a large spherical aberration due to an error of thickness of a glass cover. For this reason, for the BD, it is necessary to provide a spherical aberration error correction mechanism for correcting or compensating the spherical aberration, and in general, the spherical aberration correction function can be achieved by driving the collimate lens 005 in the direction of the optical axis. For this reason, it is assumed that the collimate lens 005 installs the spherical aberration correction mechanism 006, which can move the collimate lens 005 in the direction of the optical axis.

Also, the spherical aberration correction function can be achieved by using a liquid crystal element of a concentric circle pattern. For this reason, in the place of the spherical aberration correction mechanism 006, it does not matter if disposing a liquid crystal element in the vicinity of the collimate lens 005.

The light beam propagating through the collimate lens 005, after being converted or changed the propagating direction upon a reflection mirror (not shown in the figure), enters or is incident upon an objective lens 007, and is focused/irradiated on a predetermined information surface of the 2-layers BD. As the objective lens 007, it is assumed that an objective lens is used of NA (Numerical Aperture) 0.85, for reproducing the BD.

The objective lens 007 is installed on an actuator 008, and it can be driven in a normal line direction on the predetermined information area of the 2-layers BD (e.g., z-direction on the paper surface) and also a radial direction of the 2-layers BD (e.g., x-direction on the paper surface). However, the radial direction is used in control for tracking and drive for shifting a lens, and the normal direction is used in control for focusing.

The light beam reflecting on the predetermined information surface propagates through the objective lens 007, the collimate lens 005 and the optical branch element 004, and then enters onto an optical divider element 009. The light beam entering onto the optical divider element 009 is divided into plural numbers of light beams.

The light beam, which is divided into the plural numbers in the optical divider element 009, enters onto an optical path converter element 010. The optical path converter element 010 is an optical element for converting or changing an emission direction of the light beam entering thereon, and the light beam entering onto the optical path converter element 010 is converted or changed the emission directions thereof, and is detected on plural numbers of light receiving surfaces, which are provided within a photo detector 011.

In the optical head 001, the optical path from the light source 002 up to the 2-layers BD is described, an "up-route", and the optical path from the 2-layers BD down to the light source 002, a "down-route", respectively.

For an optical head to execute the controls of tracking and focusing are necessary control signals, for each. In the Patent Document 2 is described a method for producing the control signals with disposing an optical divider element in the down-route. In the present invention, it is also assumed that the light beam is divided into, so as to obtain the control signals necessary for the tracking and the focusing, within the optical divider element disposed in the down-route.

The light source 002 is connected with a FPC (Flexible Printed Circuit) 012, and therefore it is possible to control an amount of lights of the light beam emitting from the light source 002, from an outside of the optical head 001 through the FPC 012.

Also, the photo detector 011 is connected with a FPC 013, and therefore it is possible to transmit a signal obtained from a light receiving surface of the photo detector 011 to an outside of the optical head 001 through the FPC 013.

The light source 002 is made up with a holder 014, in one body or as a unit. The holder 014 has a function of fixing onto the adjustment device when it is assembled, and a heat radiation mechanism of making the radiation of heats, which are generated by the light source 002, easy.

The photo detector 011 is connected with a holder 015, in one body or as a unit. The holder 015 has a function of fixing onto an adjustment device when it is assembled. Preferably, the photo detector 011 is disposed to be nearly in parallel with an outer inclination part 020 of the optical head 001. This is because the photo detector 011 is adjusted as one body together with the holder 015 when assembling, and then, if it is nearly in parallel with the outer shape of the optical head 001, there can be obtained a large effect of preventing the photo detector 011, the holder 015 and the FPC 013 from being pushed out, due to shifting thereof when assembling.

The optical head 001 can move along access shafts 016 and 017, when accessing to a predetermined radial portion on the 2-layers BD.

Also, a shaft 018, passing through the objective lens 007 of the optical head 001, is in parallel with the access shafts 016 and 017, and it is shown by a broken line in the figure, which indicates the shaft coincident with the radial direction of the optical disc.

A light source driver circuit 019 is so-called a LSI (Large Scale Integration), and it has functions of producing a recording strategies and/or a pattern of light amount emitting from the light source 002 through superimposing of high-frequency.

The size of a focusing spot on the information surface, dominating the performances of signal reproduction, is determined by, such as, mainly, NA of the objective lens, a rim (an edge of pupil of the objective lens), and a wavelength of the light source. For the purpose of increasing the rim strength to be high, in general, an optical magnification in the up-route (corresponds to a ratio of focus distances between the collimate lens and the objective lens) is determined from 8 to 14 times, approximately, within the optical head for reproducing the BD. For the DVD and the CD, it is determined from 4 to 7 times, approximately, then within the optical head for reproducing the BD, the optical magnification is large comparing to the conventional one. For the purpose of increasing the optical magnification in the up-route, since it is necessary to user a collimate lens having a long focus distance, then an optical system thereof comes to be large.

Also, it is preferable that the optical divider element for enabling the 2-layers BD does not function, completely, in the up-route, but it functions in the down-route. For example, there can be considered the structure of being disposed between the optical branch element and the collimate lens, and having a polarizing characteristic, so that it does not influence upon, in the up-route. However, for it to have the polarizing characteristic, a material having anisotropy and a material having isotropy must be combined, in complex. For this reason, an optical divider element having the polarizing characteristic is an optical element, being expensive, in general. On the contrary, an optical divider element having no polarizing characteristic can be manufactured, cheaply. Then, within the optical head 001, the optical divider element 009 is disposed between the optical branch element 004 and the photo detector 011, where the optical axis is not common with, between the up-route and the down-route.

It can be said that it is tough against the positional shift of parts if disposing the optical divider element in a place where the radius or diameter of the light beam is large, because it divides the light beam into pleural numbers thereof for each area or region. And, also if the optical divider element is located in the place where the radius or diameter of the light beam is large, an emission angle of the light beam divided can be made small, therefore it is possible to obtain an effect of being tough against the fluctuation of wavelength of the light source.

If the position of disposing the optical divider element 009, which is disposed between the collimate lens 005 and the photo detector 011 comes close to the collimate lens 005, the radius or diameter of the light beam comes to be large, on the other hand, it comes to be small if it goes far away from. In this viewpoint, it is preferable to dispose the optical divider element, being manufactured to have the polarizing characteristic, between the collimate lens and the optical branch element 004, but the polarizing characteristic increases the cost up. For this reason, within the optical head 001, the optical divider element 009 is disposed between the optical branch element 004 and the photo detector 011, and not only bringing it to have non-polarizing characteristic, but as shown in the figure, also the optical divider element 009 is disposed on the nearest side to the collimate lens 005. According to this structure, it is possible to manufacture the optical head, cheaply, and to achieve the structure of being tough or tolerant with the dependency upon wavelength and/or shifting of parts thereof.

As was mentioned above, within the optical head for reproducing the 2-layers BD, it is necessary to provide the spherical aberration correction mechanism 006 and the light source driver circuit 019, and then a space for installing an optic system comes to be small; therefore, it is very difficult to install the optic system therein. Within the optical head 001, according to the present invention, the optical path converter element 010 is so disposed that the surface of the photo detector 011 comes to be in parallel with the inclination part 020 of the outer configuration thereof, and thereby arranging the photo detector 011 and the FPC 013 for use of the photo detector 011 and the holder 015, not protruding from the outer configuration thereof.

Figure 2:
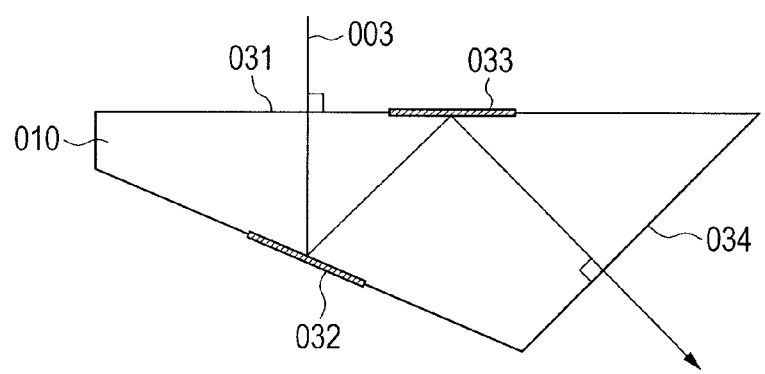
FIG. 2 is a view for showing the structure of an optical path converter element, according to the embodiment 1.

FIG. 2 is a view for showing the structure of the optical path converter element 010, according to the embodiment 1. Similarly to FIG. 1, this also shows the optical path converter element 010, in the condition of seeing it from the 2-layers BD side (in the positive direction from the negative direction, on the paper surface Z).

The optical path converter element 010 is an optical part, which is made of a glass or a plastic, having high transparency, and has four (4) pieces of surfaces, i.e., an incident surface 031, a reflection surface 032, a reflection surface 033 and an emission surface 034. The incident surface 031 and the emission surface 034 are faces having a function of transmitting the light therethrough. On the incident surface 031 and the emission surface 034, it is preferable to increase the transmission factor with forming a dielectric multi-layer film for protecting from reflection thereon. The reflection surfaces 032 and 033 are surfaces of having a function of reflecting the light beam thereon. Such function of reflecting the light beam thereon can be achieved by means of a metal film of aluminum or a dielectric multi-layer film, etc.

When the light beam (illustrated by the solid line 003) enters upon the incident surface 031, the light beams pass through the incident surface 031, and reaches to the reflection surface 032. On the reflection surface 032, the light beam reflects, and it propagates towards the reflection surface 033. On the reflection surface 033, the light beam reflects, again, and passes through the emission surface 034, and then the light beam is emitted from the optical path converter element 010.

The incident surface 031 is disposed to be nearly perpendicular with the incident light beam, as is shown in the figure. And, the incident surface 034 is also disposed to be nearly perpendicular with the emitting light beam, as is shown in the figure. In this manner, with disposing the incident surface 031 and the emission surface 034 to be nearly perpendicular with the light beam, respectively, it is possible to convert or change an angle of propagating optical path, without generating unnecessary aberration therein.

In this manner, the optical head 001 comprises the light source 002 for emitting the light beam therefrom, the optical branch element 004 for penetrating the incident light beam therethrough by a predetermined amount thereof and for reflecting the remaining amount of the lights thereupon, the objective lens 007 for focusing the light beam on the optical information recording medium, the photo detector 013 for receiving the light beam reflecting upon the optical information recording medium, and the optical path converter element 010 for converting the angle of the propagating optical path of the light beam. And, in the present embodiment, the optical path converter element 010 is disposed on the optical path between the optical branch element 004 and the photo detector 013. Also, the optical path converter element 010 comprises the light incident surface 031, upon which the light beam enters, and the emission surface 034, from which the light beam emits, and in the structure thereof, the light beam is reflected at different angles at least two (2) times within the optical path converter element, during the time when the light beam passes through a space defines between the incident surface 031 and the emission surface 034. Further, with the disposition of the optical path converter element 010 for overcoming the problem of limitation of the outer configuration of a thin-type optical head, there can be considered a method differing from that of the present embodiment. In this regard, detailed explanation will be given later, in an embodiment 4, which will be mentioned later.

Embodiment 2

Detailed explanation will be given about an embodiment 2, by referring to the figures attached. Herein, explanation will be given on a variation of the optical path converter element 010 according to the embodiment 1.

Figure 3:
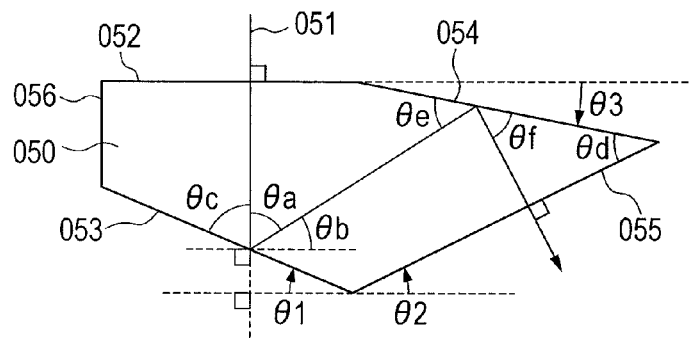
FIG. 3 is a view for showing the structure of an optical path converter element, according to an embodiment 2.

FIG. 3 is a view for showing an outlook of the structure of an optical path converter element 050, according to the embodiment 2. This FIG. 3 is also assumed that the optical path converter element 050 is seen from the 2-layers BD side (in the positive direction of the negative direction, on the paper surface z), similarly to those shown in FIGS. 1 and 2.

The optical path converter element 050 has four (4) pieces of surfaces, i.e., an incident surface 052, a reflection surface 053, a reflection surface 054 and an emission surface 055. The incident surface 052 and the emission surface 055 are surfaces having a function of transmitting the light beam therethrough. The reflection surfaces 053 and 054 are surfaces having function of reflecting the light beam thereon, respectively.

When the light beam (illustrated by a solid line 051) enters upon the incident surface 052, the light beam passes through the incident surface 052, and reaches to the reflection surface 053. On the reflection surface 053 is reflected the light beam, and they propagate towards the reflection surface 054. On the reflection surface 054, the light beam reflects, again, and passes through the emission surface 055, and then the light beam is emitted from the optical path converter element 050.

The incident surface 052 is disposed to be nearly perpendicular with the incident light beam, as is shown in the figure. And, the incident surface 055 is also disposed to be nearly perpendicular with the emitting light beam, as is shown in the figure. In this manner, with disposing the incident surface 052 and the emission surface 055 to be nearly perpendicular with the light beam, it is possible to convert or change an angle of propagating optical path, without generating unnecessary aberration therein.

The optical path converter element 010 is constructed with the incident surface 031 and the reflection surface 033 on the same plane. On the contrary to this, the optical path converter element 050 differs from, in particular, in an aspect that the reflection surface 054 thereof has an angle (θ3) to the incident surface 052, In this manner, With provision of the angle between the reflection surface 054 and the incident surface 052, in this manner, it is possible to make the angle of the light beam emitting therefrom different.

Further, the incident surface 052 and the reflection surface 053 are so constructed in the figure that they are cut off by a surface 056 nearly perpendicular to the incident surface 052. This is, because of the region where the light beam does not propagate, to remove it, for the purpose of brining the optical path converter element to be small. Also, the surface 056 may be utilized, as a reference surface when assembling the optical head, or as a supporting surface. Of course, it does not matter if setting the surface 056 at an angle differing from that shown in the figure.

Also, a crossing point between the reflection surface 053 and the emission surface 055, or a crossing point between the reflection surface 054 and the emission surface 055 protrude or rise up in the figure, however it is preferable to provide a "C-surface cut" or the like, for protecting it from being broken/cutout.

Herein, it is assumed that an angle defined by the incident surface 052 and the reflection surface 053 of the optical path converter element 050 is "θ1", an angle defined by the incident surface 052 and the emission surface 055 is "θ2", and an angle defined by the incident surface 052 and the reflection surface 054 is "θ3", respectively. And, it is also assumed that the direction of an arrow is positive.

Also, definition is so made that an angle defined by the light beam incident upon the reflection surface 053 and the light beam reflecting thereon is "θa", an angle defined by the light beam reflecting on the reflection surface 053 and the incident surface is "θb", an angle defined by the reflection surface 053 and the light beam incident upon the reflection surface 053 is "θc", an angle defined by the reflection surface 054 and the emission surface 055 is "θd", and an angle defined by the reflection surface 054 and the light beam incident upon the reflection surface 054 is "θe", and an angle defined by the reflection surface 054 and the light beam reflecting on the reflection surface 054 is "θf", respectively.

It is already known that the reflection of the light beam follows a law of reflection, i.e., the angle, which is defined by a normal line of the reflection surface and the incident light beam, is equal to the angle, which is defined by a normal line of the reflection surface and the reflecting light beam. For this reason, the following equation (Eq. 1) can be established from corresponding angles of θa, θc and θ1.

$$\theta a + 2 + \theta c = \theta 1 + \theta c \quad (\text{Eq. 1})$$

Also, similarly, since "θe" is equal to "θf" from the law of reflection, the following equation (Eq. 2) can be established:

$$\theta e = \theta f \quad (\text{Eq. 2})$$

Since "θd" corresponds to addition of the corresponding angles θ2 and θ3, then the following equation (Eq. 3) can be established:

$$\theta 2 + \theta 3 = \theta d \quad (\text{Eq. 3})$$

Also, from the figure, the following two (2) equations can be established:

$$\theta a + \theta b = R \quad (\text{Eq. 4})$$

$$\theta a + \theta f = R \quad (\text{Eq. 5})$$

From the above equations, the following equation can be derived from, by dissolving the equations so as to remove "θf" from "θa":

$$\theta 2 = 2 \times (\theta 1 + \theta 3) \quad (\text{Eq. 6})$$

Further, in the above equations, "R" presents an angle of 90 degree.

As was mentioned previously, within the optical head according to the present invention, the optical path converter element is so disposed that the surface of the photo detector comes to be in parallel with the inclination portion on the outer configuration of the optical head, and thereby to prevent the photo detector and the FPC for use of the photo detector, and/or the holder from being pushed out from the outer configuration thereof. For this reason, it is necessary to set the optical path converter element to be nearly in parallel with the outer configuration of the optical head. In order to be nearly in parallel with the outer configuration of the optical head, it is enough to set "θ2" at an angle being nearly in parallel with the outer configuration of the optical head. It is possible to obtain that "θ2", from "θ1" and "θ3" by the relating equation, i.e., the (Eq. 6).

Figure 4:
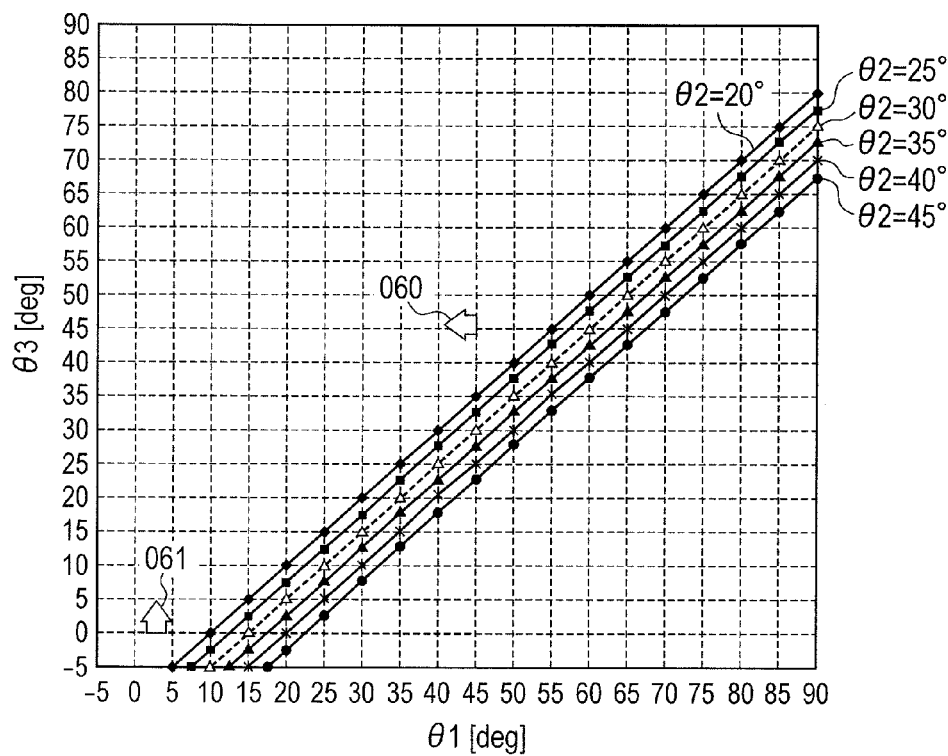
FIG. 4 shows a graph for calculating angles θ1, θ2 and θ3 of optical path converter elements within the embodiment 2.

Herein, in FIG. 4 is shown a result of calculating "θ1" and "θ3" by the relating equation (Eq. 6), when applying "θ2" a parameter. A graph shows the angle "θ1" on the horizontal axis and the angle "θ3" on the vertical axis thereof, and shows values calculated while changing "θ2" from 20 degrees up to 45 degrees, every 5 degrees.

It can be seen that, when enlarging the angle "θ2", the calculation result falls down into a lower direction on the paper surface to the axis of "θ3", with keeping the same inclination.

The inclination portion on the outer configuration, with an ordinary optical head, lies within a region, at the smallest 20 degrees and at the largest 45 degrees. Thus, it is enough that "θ2" lays from 20 degrees up to 45 degrees. When "θ3", being the angle of the reflection surface 054, is negative, since the incident surface 052 and the reflection surface 054 must be concave-like, it is difficult to machining those. For this reason, it is preferable that the angle "θ3" is positive. "θ1", being the angle of the reflection surface 053, must be smaller than 90 degrees. That "θ1" is 90 degrees means, the incident surface 052 and the reflection surface 053 come cross, approximately, at right angles (90 degree), and this is since the reflection surface 053 cannot be the reflection surface.

Also, if making "θ1" smaller than 45 degrees, small-sizing can be achieved. This is because, when "θ1" is larger than 45 degrees, an emission point of the emission surface 055 is shifted into a side of an incident direction of the optical path converter element 050, more than a reflection point of the reflection surface 053, and thereby enlarging the optical path converter element 050.

Namely, when trying to install the optical head into a small space, it is preferable that "θ1" is smaller than 45 degrees (in the direction of an arrow 060 in the figure), and that "θ3" is positive (in the direction of an arrow 061 in the figure).

For example, in case where the inclination part of the outer configuration of the optical head is 30 degrees, thus, when "θ2" is at 30 degrees, the angle "θ1" can be selected within a range from 15 degrees up to 45 degrees. If determining "θ1" at 15 degrees, a point on the incident surface 052, at which the light beam enters or is incident upon, comes very close to a point on the reflection surface 054, upon which the light beam reflects. On the contrary, if determining "θ1" at 45 degrees, then the point on the reflection surface 054, upon which the light beam reflects, comes very close to a point on the emission surface 055, from which the light beam emits. For the purpose of not bringing the radius or diameter to be short, it is preferable to determine the surface distance between the incident surface 052 and the reflection surface 053 to be large in the former case, while to determine the surface distance between the reflection surface 053 and the emission surface 055 to be large in the latter case. For achieving small-sizing of optical head, since it is advantageous to bring the optical path converter element to be small, and then if determining "θ1" at 30 degrees, being an average between the 15 degrees and the 45 degrees, it is possible to achieve the small-sizing of the optical path converter element at the most. For this reason, when determining "θ1" by the inclination part of the outer configuration of the optical head, it can be said that it is preferable to obtain the range of "θ1", from the graph shown in FIG. 4, and thereby determining to be in the vicinity of the averaged value.

Figure 5:
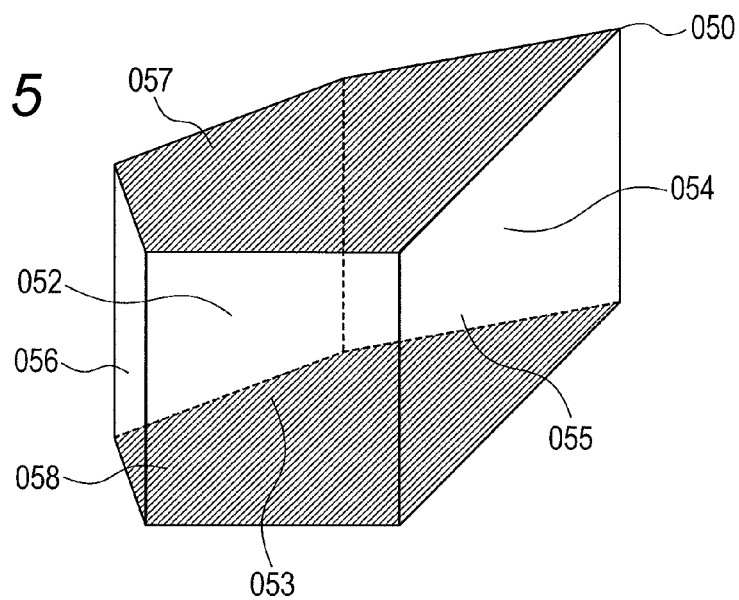
FIG. 5 is a three-dimensional view of the optical path converter element within the embodiment 2.

FIG. 5 shows a three-dimensional view of the optical path converter element 050. FIG. 3 is a plane view of seeing that shown in FIG. 3 from an upper surface 057 thereof. The optical path converter element 050 is constructed with three-dimensional surfaces, including the upper surface 057 and a lower surface 058, as is shown in FIG. 5.

Thus, the optical path converter element 050 comprises the incident surface 052, upon which the light beam enters or is incident, and the emission surface 055, from which the light beam emits, wherein the light beam reflects at least two (2) times, and in the structure of which, the optical path converter element 050, at different angles, during when it passes through between the incident surface 052 and the emission surface 055. Also, the optical path converter element 050 is so constructed that, at least, the angle "θ2" defined by the incident surface 052 and the emission surface 055 is smaller than 45 degrees.

Embodiment 3

Detailed explanation will be given on an embodiment 3, according to the present invention, by referring to figures. Herein, the explanation will be made with assuming an optical head, which is able to record or reproduce the 2-layers BD, the DVD and the CD. Should not be limited to the combination of the 2-layers BD, the DVD and the CD, but it does not matter with other combinations, such as, a combination of the 2-layers BD and the DVD, or a combination of a multi-layers BD and the DVD and the CD, etc.

Figure 6:
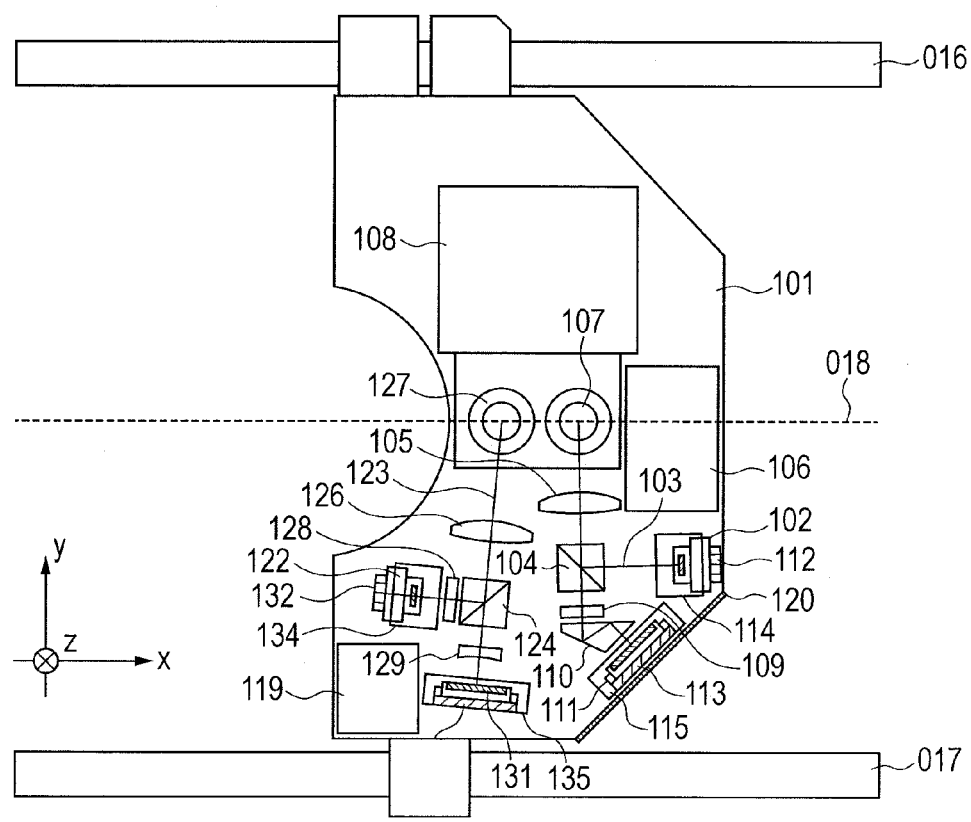
FIG. 6 is a view for showing the structure of an optical head according to an embodiment 3.

FIG. 6 is an outlook view for showing the structure of an optical head 101, according to the embodiment 3. The figure is a view of seeing the optical head 101 from an optical disc to be set by the BD or the DVD (in the positive direction from the negative direction on the paper surface z).

First of all, explanation will be given on an optic system of the 2-layers BD. A light beam is emitted from a BD light source 102 in the form of the divergent pencil of rays. On the BD, as was mentioned previously, it is common to apply a semiconductor laser having a wavelength band from 395 nm to 415 nm, and then it is assumed that a light beam having wavelength of about 405 nm is emitted from the BD light source 102. Further, a propagation route of the light beam, which is emitted from the BD light source 102, is shown in the figure by a solid line 103.

The light beam emitting from the ED light source 102 enters or incident upon a BD optical branch element 104. The BD optical branch element 104 is an element for passing a predetermined amount of incident light beam therethrough, and for reflecting the remaining amount of lights thereupon. This optical branch element can be achieved, for example, a flat mirror or a prism, or a polarizing prism, etc.

A light beam reflecting on the BD optical branch element 104 is converted into light beams nearly in parallel with by means of a BD collimate lens 105. A BD spherical aberration correction mechanism 106 is a mechanism for driving a BD collimate lens 105 in a direction of an optical axis (in y-direction on the paper surface), and it can be achieved by using an electromagnetic motor or a piezoelectric element, etc. Herein, it is assumed that there is installed BD spherical aberration correction mechanism 106, with which the BD collimate lens 105 can move in the direction of optical axis.

Also, the spherical aberration correction function can be achieved by using a liquid crystal element of a concentric circle pattern. For this reason, in the place of the BD spherical aberration correction mechanism 106, it does not matter if disposing a liquid crystal element in the vicinity of the BD collimate lens 105.

The light beam propagating through the BD collimate lens 105, after being converted or changed the propagating direction upon a reflection mirror (not shown in the figure), enters or is incident on a BD objective lens 107, and is focused/irradiated on a predetermined information surface of the 2-layers BD. As the BD objective lens 107, it is assumed that an objective lens is used of NA (Numerical Aperture) 0.85, for reproducing the BD.

The BD objective lens 107 is installed on a two (2) lens actuator 108, and it can be driven in a normal line direction on the predetermined information area of the 2-layers BD (e.g., z-direction on the paper surface) and also a radial direction of the 2-layers BD (e.g., x-direction on the paper surface).

The light beam reflecting on the predetermined information surface propagates through the BD objective lens 107, the BD collimate lens 105 and the BD optical branch element 104, and then enter onto a BD optical divider element 109. The light beam entering onto the optical divider element 109 is divided into plural numbers of light beams.

The light beam, which is divided into the plural numbers in the BD optical divider element 109, enters onto an optical path converter element 110. The optical path converter element 110 is an optical element for converting an emission direction of the light beam entering therein, and the light beams entering onto the optical path converter element 110 are converted the emission directions thereof, and are detected on plural numbers of light receiving surfaces, which are provided within a photo detector 111. The optical path converter element 110 corresponds to the optical path converter element 050 in the embodiment 2.

In the optical head 101, the optical path from the BD light source 102 up to the 2-layers BD is described, an "BD up-route", and the optical path from the 2-layers BD down to the BD light source 102, a "BD down-route", respectively.

For an optical head to execute the controls of tracking and focusing are necessary control signals, for each. In the Patent Document 2 is described a method for producing the control signals with disposing an optical divider element in the BD down-route. In the optical head 101, it is also assumed that the light beam is divided into, so as to obtain the control signals necessary for the tracking and the focusing, within the BD optical divider element disposed in the BD down-route.

The BD light source 102 is connected with a FPC 112, and therefore it is possible to control an amount of light of the light beam emitting from the BD light source 102, from an outside of the optical head 101 through the FPC 112.

Also, the BD photo detector 111 is connected with a FPC 113, and therefore it is possible to transmit a signal obtained from a light receiving surface of the BD photo detector 111 to an outside of the optical head 101 through the FPC 113.

The BD light source 102 is made up with a holder 114, in one body or as a unit. The holder 114 has a function of fixing onto the adjustment device when it is assembled, and a heat radiation mechanism of making the radiation of heats, which are generated by the BD light source 102, easy.

The BD photo detector 111 is connected with a holder 115, in one body or as a unit. The holder 115 has a function of fixing onto an adjustment device when it is assembled. Preferably, the BD photo detector 111 is disposed to be nearly in parallel with an outer inclination part 120 of the optical head 101. This is because the photo detector 111 is adjusted as one body together with the holder 115 when assembling; and then, if it is nearly in parallel with the outer shape of the optical head 101, there can be obtained a large effect of preventing the photo detector 111, the holder 115 and the FPC 113 from being pushed out, due to shifting when assembling.

In the optical head 101, similar to the optical head 001, since the optical axis is not in common, on the BD up route and the BD down route, not only the BD optical divider element 109 is provided between the BD optical branch element 104 and the BD photo detector 111, but as is shown in the figure, the BD optical divider element 109 is disposed to a side near to the BD collimate lens 105.

Next, explanation will be given on an optic system of two (2) waves for the DVD and the CD. From a two (2) wavelengths light source 122 is emitted a light beam in the form of the divergent pencil of rays. It is common to use a semiconductor laser having a wavelength band of 660 nm, for recording and/or reproducing the DVD, and that having a wavelength band of 780 nm, for recording and/or reproducing the CD. In recent years, development is made on a two (2) wavelengths light source for enabling to emit both the light beam of the wavelength band of 660 nm and the light beam of the wavelength band of 780 nm, from an inside of one (1) piece of housing, and it is adopted in a large number of optical heads. For this reason, the 2-wavelengths light source 122 is assumed to emit both the light beam of the wavelength band of 660 nm and the light beam of the wavelength band of 780 nm therefrom. A solid line 123 in the figure shows the route of the light beam emitting from the 2-wavelengths light source 122.

The light beam emitting from the 2-wavelengths light source 122 enters onto a two (2) wavelengths diffraction grating 128. The 2-wavelengths diffraction grating 128 produces a sub-light beam for reproducing a tracking error signal from both optical discs, i.e., the DVD and the CD. For the 2-wavelengths diffraction grating 128 are proposed plural numbers of types or methods thereof. For example, within a one, having two (2) pieces of surfaces of diffraction grating, when the light beam having wavelength of 660 nm enters thereon, it is diffracted on one of the diffraction grating surfaces, thereby producing the sub-light beam for use of DVD, while it does not diffract on the other surface. When the light beam having wavelength of 780 nm enters thereon, then the light beam having wavelength of 780 nm is diffracted on the diffraction grating surface, on which no diffraction is made on the light beam having wavelength of 660, and thereby producing the sub-light beam for use of CD, while it passes through, on the diffraction grating surface, upon which the light beam having wavelength of 660 nm is diffracted. Thus, there is already known a 2-waves diffraction grating utilizing such wavelength dependency of depth of grooves. The 2-wavelengths diffraction grating 128 may be any kind, as far as it can produce sub-light beam for reproducing the tracking error signal from the optical discs, e.g., the DVD and the CD.

The light beam emitting from the 2-wavelengths diffraction grating 128 enters or is incident upon a 2-wavelengths optical branch element 124. The 2-wavelengths optical branch element is an element for passing a predetermined amount of incident light beam therethrough, and for reflecting the remaining amount of lights thereupon. In the figure, the 2-wavelengths diffraction grating 128 is assumed to be a prism, but of course, it does not matter if it is a mirror.

The light beam reflecting upon the 2-wavelengths optical branch element 124 is converted into light beams nearly in parallel with, by a 2-wavelengths collimate lens 125. The optical head for reproducing the DVD and the CD can be put in a practical use without the spherical aberration correction function. For this reason, the 2-wavelengths collimate lens 125 is assumed to be a fixed one.

The light beam propagating through the 2-wavelengths collimate lens 125, after being converted the propagation direction thereof, on a reflection mirror (not shown in the figure), into the z-direction on the paper surface, enters on a 2-wavelengths objective lens 127, wherein the light beam having wavelength of 660 nm is focused/irradiated upon the information recording surface of the DVD, while the light beam having wavelength of 780 nm is focused/irradiated upon the information recording surface of the CD. It is assumed that the 2-wavelengths objective lens 127 has NA of 0.6 to the light beam having wavelength of 660 nm, and NA of 0.45 to the light beam having wavelength of 780 nm.

Also, the 2-wavelengths objective lens 127 is mounted on a two (2) lenses actuator 128, and it can be driven into the normal line direction (e.g., the z-direction on the paper surface) and the radial direction (e.g., the x-direction on the paper surface) on the predetermined information surface of the DVD and the CD.

The light beam reflecting upon the information surfaces of the DVD and the CD is detected on light receiving surfaces within a two (2) wavelengths photo detector 131, after passing through the 2-wavelengths objective lens 127, the 2-wavelengths collimate lens 125 and a two (2) wavelengths detection lens 129.

The 2-wavelengths detection lens 129 is constructed with a cylindrical lens and a spherical lens, and when the light beam passes through the 2-wavelengths detection lens 129, a predetermined astigmatism is given in the direction of about 45 degree; this is used for detection of the focus error signal with an astigmatism method. This detection lens 129 has functions of rotating the direction of astigmatism into any direction, and determining a size of a light focusing spot on the 2-wavelengths photo detector 131, at the same time.

And, although it is assumed to use the lens to give the astigmatism in the present embodiment, but of course, it does not matter to adopt such a construction of utilizing the astigmatism generated by means of a mirror.

The light beam guided on the 2-wavelengths photo detector 131 are used for detection of information signals recorded on the optical disc, and for detection of positional control signals of the light spots irradiated on the optical disc, such as, the focus error signal and the tracking error signal, etc., for example.

In the optical head 101, the optical path from the 2-wavelengths light source 122 to the DVD or the CD is described, a "2-wavelengths up-route", and the optical path from the DVD or the CD down to the 2-wavelengths photo detector 131, a "2-wavelengths down-route", respectively. Within the 2-wavelengths optic system for the DVD and the CD, in general, a magnification of the 2-wavelengths up-route is determined within a range, from 5 times to 6.6 times. For this reason, the 2-wavelengths optic system is small, comparing to the BD optic system, and it can be installed, but without applying an optical converter element therein.

The 2-wavelengths light source 122 is connected with a FPC 132, and therefore it is possible to control an amount of lights of the light beam emitting from the 2-wavelengths light source 122, from an outside of the optical head 101 through the FPC 132.

Also, the 2-wavelengths photo detector 131 is connected with a FPC 133, and therefore it is possible to transmit a signal obtained from a light receiving surface of the 2-wavelengths photo detector 131 to an outside of the optical head 101 through the FPC 133.

The 2-wavelengths light source 122 is made up with a holder 134, in one body or as a unit. The holder 134 has a function of fixing onto the adjustment device when it is assembled, and a heat radiation mechanism of making the radiation of heats, which are generated by the 2-wavelengths light source 122, easy.

The 2-wavelengths photo detector 131 is connected with a holder 135, in one body or as a unit. The holder 135 has a function of fixing onto an adjustment device when it is assembled.

However, within the optic system for DVD and CD, only the light beam having the wavelength band of 660 nm propagates, when reproducing the DVD, while only the light beam having the wavelength band of 780 nm propagates, when reproducing the CD.

When the optical head 101 accesses to a predetermined radial position on the 2-layers BD or the DVD, it can mover along the access shafts 016 and 017.

Also, the shaft 018 passing through the BD objective lens 107 of the optical head 101 is in parallel with the access shafts 016 and 017, and it is shown by a broken line in the figure, which indicates the shaft coincident with the radial direction of the optical disc.

A light source driver circuit 119 is so-called the LSI, and it has functions of producing a recording strategies and/or a pattern of light amount emitting from the BD light source 102 and the 2-wavelengths light source 122 through superimposing of high-frequency.

Within the optical head 101 for enabling the BD and the DVD and the CD, the optic system for the BD and the 2-wavelengths optic system for the DVD and the CD, as well as, the BD spherical aberration correction mechanism 106 and the light source driver circuit 119, are necessary, and then a space for mounting the optic systems comes to be small, therefore it is very difficult to mount the optic systems, in particular, the BD photo detector 113. Within the optical head 101 according to the present invention, the optical path converter element 110 is so arranged that a surface of the BD photo detector 113 be nearly in parallel with the outer inclination part 120, and thereby preventing the photo detector 111 and the FPC 133 for use of the photo detector 111, and/or the holder 115, from being pushed out from the outer configuration.

For example, in case where the optical path converter element 110 is not provided, the 2-wavelengths photo detector 131 and the BD photo detector 113 are aligned side by side, and then interference between parts comes up to a problem and an installation thereof is difficult. For this reason, within the optical head 101, because of disposition of the optical path converter element 110 therein, it is possible to avoid the interference between parts, e.g., the 2-wavelengths photo detector 131 and the BD photo detector 113.

Further, with the structure of the two (2) lenses actuator, it is difficult to optimize a coma aberration for each of the BD, the DVD and the CD. For this reason, it does not matter to dispose a liquid crystal element for correcting the coma aberration in the vicinity of the BD collimate lens 105 or the 2-wavelengths collimate lens 125.

Also, the optical axis defined by the BD objective lens 107 and the BD collimate lens 105 is not in parallel with the optical axis defined by the 2-wavelengths objective lens 127 and the 2-wavelengths collimate lens 125, but is inclined with. This is because of a measure of disposition, so that the BD collimate lens 105 and the 2-wavelengths objective lens, etc., do not generate the interference on the outer configurations thereof.

In this instance, it is necessary to determine the angles, θ1, θ2 and θ3 of the optical path converter element 110, by taking the fact that the relationship of the inclination of the incident surface on the optical path converter element 110 to the outer inclination part 120 changes into the consideration thereof. In more details, if assuming that an angle of the optical axis is "Δθ", which is defined by the track direction on the optical disc (e.g., a y-axis in the figure) and the BD objective lens 107 and the BD collimate lens 105, an angle of emission surface of the optical path converter element 110 is "θ3", and an angle of the inclination part 120 is "θS", respectively, then "θ3" can be calculated from the following equation (Eq. 7):

$$\theta 3 = \theta S - \Delta p \theta \qquad \text{(Eq. 7)}$$

With determination of θ3 in accordance with the equation (Eq. 7), it is possible to bring the photo detector 111 to be in parallel with the outer inclination part 120.

Figure 7:
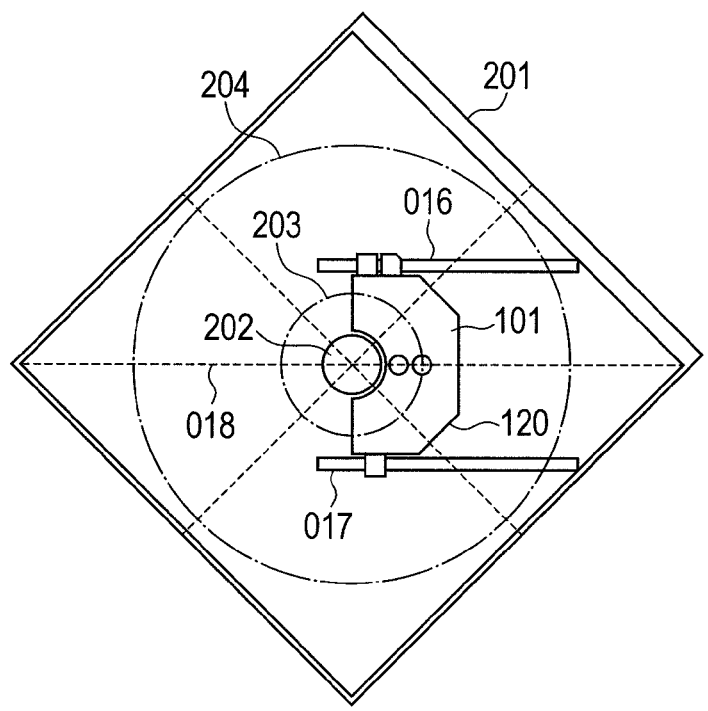
FIG. 7 is a view for showing the structure when the optical head moves to an inner periphery of an optical disc, within an optical drive according to the embodiment 3.
Figure 8:
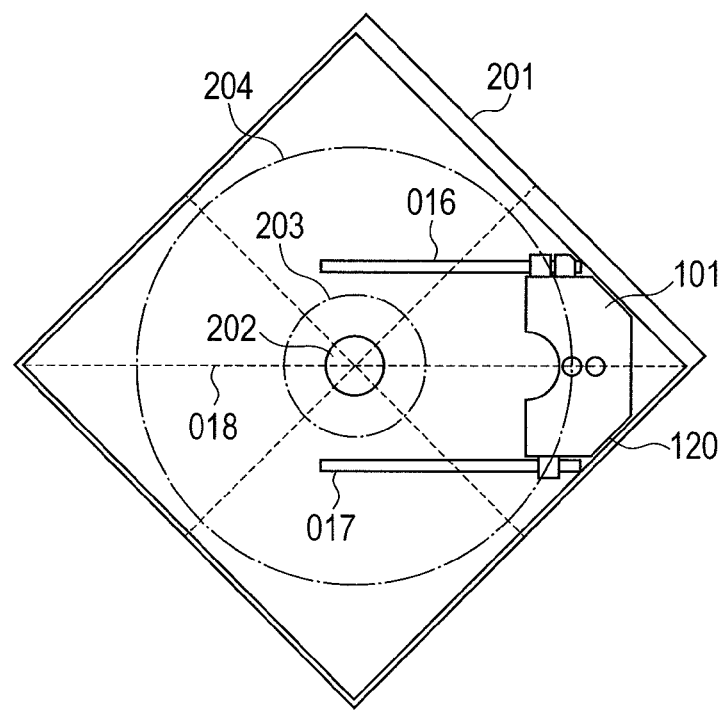
FIG. 8 is a view for showing the structure when the optical head moves to an outer periphery of the optical disc, within the optical drive according to the embodiment 3.

FIGS. 7 and 8 are outlook views for illustrating the optical head 101 within a thin-type optical drive, which is used in a notebook-type personal computer, etc. FIG. 7 shows the optical head 101 when it is at the innermost periphery of the optical disc, and FIG. 8 shows the optical head 101 when it is at the outermost periphery of the optical disc, respectively.

In FIGS. 7 and 8, within the optical drive 201 is provided a spindle motor 202 for rotating the optical disc. To that spindle motor 202 is fixed the optical disc, and the innermost periphery part of the information region on the optical disc is shown by one-dotted chain line 203 in the figure. Also, the outermost periphery part of the information region is shown by one-dotted chain line 204 in the figure.

As was mentioned previously, the optical head 101 can move along the access shafts 016 and 017 when accessing to the predetermined radial position on the optical disc. Also, the shaft 018, passing through the BD objective lens 107 and the 2-wavelengths objective lens 127 of the optical head 101, is a shaft in parallel with the access shafts 016 and 017, and is shown by a broken line illustrating the shaft coincident with the radial direction of the optical disc.

When accessing to the innermost periphery part of the information region, as is shown in FIG. 7, the optical head 101 moves to the innermost periphery part of the optical disc. In this instance, it can be seen that the optical head 101 is in a circular shape of the outer configuration on the inner periphery side of the disc, so as not to interfere the spindle motor 202 with the outer configuration thereof. Also, when accessing to the outermost periphery part of the information region, as shown in FIG. 8, the optical head 101 moves to the outermost periphery part of the optical disc. In this instance, not to come out from an outer side surface of the optical drive 201, the optical head 101 has such a configuration as is shown by the outer inclination part 120 in the outer periphery direction of the optical disc.

Thus, an inner peripheral part and an outer peripheral part of the optical head 101 cannot be made large due to restriction of outer configuration thereof. Also, the outer peripheral part must be an inclination part to be nearly in parallel with the outer side surface of the optical drive 201.

With using the optical path converter element 110 as in the optical head 101, it is possible to utilize the inclination part 120, which is generated due to the restriction of outer configuration.

Herein, for the purpose of showing drawbacks of the restriction of outer configuration more clearly, within the thin-type optical drive to be used in the notebook-type personal computer, etc., explanation will be made on the optic system, in case where it is assumed a reflection mirror is used, in the place of the optical path converter element 110.

Figure 9:
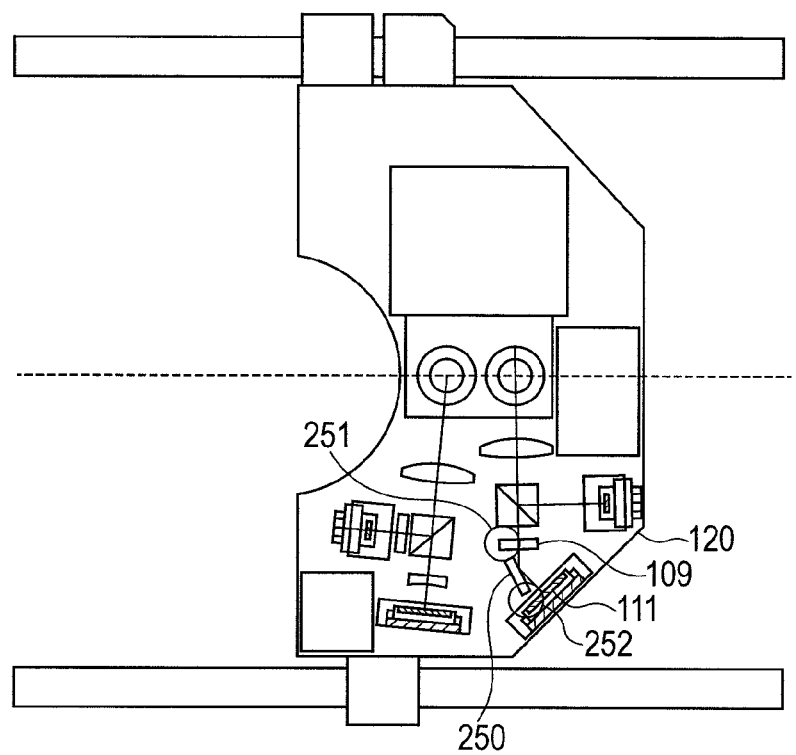
FIG. 9 is a view for showing the structure of the optical head according to the embodiment 3, in particular, disposing reflection mirrors in the place of the optical path converter elements.

FIG. 9 illustrates the optic system assuming to use the reflection mirror 250 therein, but not the optical path converter element 110, for example, within the optical head 101.

When disposing the reflection mirror 250 between the BD optical divider element 109 and the BD photo detector 111, but if not making the angle of the reflection mirror 250 steep, it is impossible to guide the BD photo detector 111 to the inclination part 120. For example, if trying to determine the angle corresponding to θ3 to 30 degrees, it is necessary to set the reflection mirror 250 at an angle 30 degrees to an incident light. In this case, the interference of outer configuration between the BD optical divider element 109 and the reflection mirror 250 (i.e., the region enclosed by a circle 251 in the figure), and/or the interference of outer configuration between the BD photo detector 111 and the reflection mirror 250 (i.e., the region enclosed by a circle 252 in the figure) come out to be problems.

As was mentioned above, with using the optical path converter element 110, which was explained in FIG. 6, it is possible to avoid the interference of outer configuration, easily, when using the reflection mirror therein.

Figure 10:
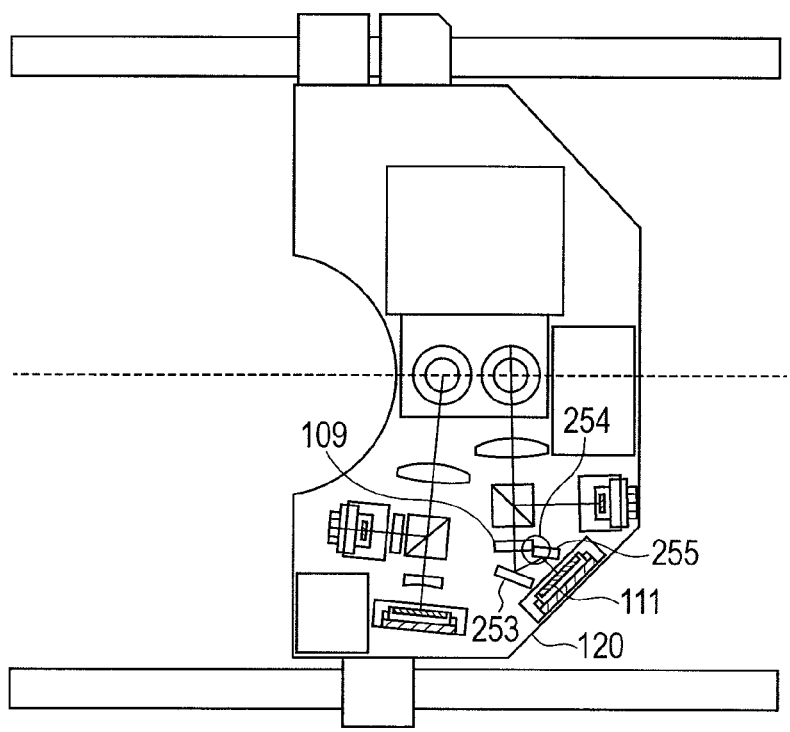
FIG. 10 is a view for showing the structure of optical head according to the embodiment 3, in particular, disposing the reflection mirrors in the place of the optical path converter elements.

FIG. 10 shows an optic system, assuming to use two (2) pieces of reflection mirrors 253 and 254 in the optical head 101, for example, but not the optical path converter element 110.

When disposing the reflection mirrors 253 and 254 between the BD optical divider element 109 and the BD photo detector 111, there is no space for installing them, in particular, for the reflection mirror 254, and there comes out a problem of the interference of outer configuration of the BD optical divider element 109 and the reflection mirror 254 (i.e., the region enclosed by a circle 255 in the figure). Also, because of an increase of the number of the parts, it has a demerit of receiving an ill influence of shifting of the parts, easily, accompanying with change of temperature. Further, because of the increase of the number of the parts, there is a demerit of increasing a number of processes in assembling.

As was mentioned above, if using the optical path converter element 110 explained in FIG. 6, it is possible to avoid the interference of outer configuration when disposing two (2) pieces of reflection mirrors, easily. Also, it can be said that it is tough to the ill influence of shifting of the parts accompanying with change of temperature. Furthermore, there is a merit that a number of the processes in assembling is small.

The optical head 101 comprises a first light source for emitting a first light beam therefrom, i.e., the BD light source 102, a second light source for emitting a second light beam therefrom, i.e., the 2-wavelengths light source 122, a first light focusing element for focusing the first light beam onto an optical information recording medium, i.e., the BD objective lens 107, a second light focusing element for focusing the second light beam onto the optical information recording medium, i.e., the 2-wavelengths objective lens 127, a first photo detector for receiving the first light beam reflecting upon the optical information recording medium, i.e., the BD photo detector 113, and a second photo detector for receiving the second light beam reflecting upon the optical information recording medium, i.e., the 2-wavelengths photo detector 131, wherein the BD photo detector 113 is located in an outside than the 2-wavelengths photo detector 131 in the radial direction of the optical information recording medium (i.e., the positive x-direction in the figure), and further having the optical path converter element 110 for converting or changing the angle of propagating optical path of the first light beam.

Also, the optical path converter element 110 comprises an incident surface, upon which the light beam enters or is incident, and an emission surface, from which the light beam emits, and it has such structures that the light beam reflects at least two (2) times at different angles within the optical path converter element 110, during the time when it passes through a space defined between the incident surface and the emission surface, and the angle defined by the incident surface and the emission surface is less than 45 degrees. Also, it has such structures that the light beam reflecting on the optical information recording medium enters onto the BD photo detector 113 after passing through the optical path converter element 110.

Embodiment 4

Explanation will be given on an embodiment 4, according to the present invention, by referring to attached figures. Herein, explanation will be given on a variation of the optical head 001 according to the embodiment 1. Thus, detailed explanation will be given about a method differing from the embodiment 1, in particular, disposition of the optical path converter element 010 for overcoming the problem of the restriction on outer configuration of the thin-type optical head.

Figure 11:
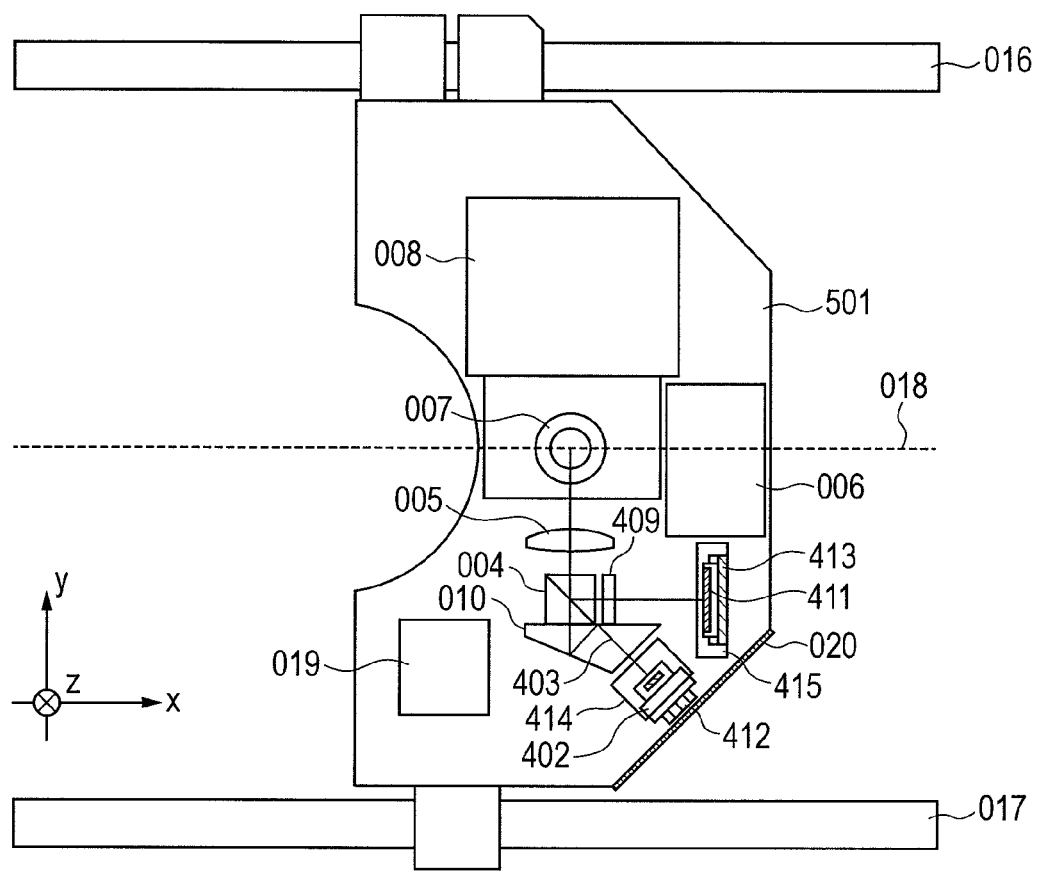
FIG. 11 is a view for showing the structure of the optical head, according to an embodiment 4.

FIG. 11 is an outlook view for showing the structure of an optical head 401, according to the embodiment 4. The optical head 401 differs from the optical head 001 in an aspect that the arrangement of the light source 002 and the photo detector 011 thereof are changed. In the figure, the same reference numerals are attached on the parts, which are not changed the positions thereof in the optical head 001. Also, similar to FIG. 1, this FIG. 11 is a view of the optical head 401, seeing it from the optical disc, i.e., from a side of the 2-layers BD (in the positive direction from the negative z-direction on the paper surface).

The light source 402 corresponds to the light source 002 of the optical head 001. From the light source 402 is emitted the light beam having wavelength of about 405 nm, similar to the light source 002, in the form of the divergent pencil of rays. Propagation route of the light beam emitting from the light source 402 is shown by solid lines 403 in the figure.

The light beam emitting from the light source 402 enters or is incident upon the optical path converter element 010, and after being reflected two (2) times within the optical path converter element 010, the light beam, being converted or changed the emission direction thereof, enters or is incident upon the optical branch element 004.

The light beam reflecting on the optical branch element 004 is converted into light beams nearly in parallel with, by the collimate lens 005.

The light beam propagating through the collimate lens 005, after being converted or changed the propagation direction thereof into the x-direction on the paper surface upon the reflection mirror (not shown in the figure), enters onto the objective lens 007, and is focused/irradiated upon the predetermined information surface of the 2-layers BD.

The light beam reflecting on the predetermined information surface propagates through the objective lens 007 and the collimate lens 005, and reflects on the optical branch element 004 to be incident upon an optical divider element 409. The optical divider element 409 corresponds to the optical divider element 009 of the optical head 001. The light beam entering onto the optical divider element 409 is divided into plural numbers of light beams.

The light beams, which are divided by the optical divider element 409, are detected by plural numbers of light receiving surfaces within the photo detector 411.

In the optical head 401, the optical path from the light source 402 up to the 2-layers BD is described, an "up-route", and the optical path from the 2-layers BD down to the photo detector 411, a "down-route", respectively. The optical head 401 has such structure that the arrangement of the up-route and the down-route are changed comparing to the optical head 001. For this reason, although the optical path converter element 010 is disposed on the down-route in the optical head 001, but on the other hand, the optical path converter element 010 is disposed on the up-route in the optical head 401 according to the present embodiment. Normally, within the optical head, it is a key to manage the aberration of the up-route to be small, so that a spot of lights focused on the optical disc does not come to be large due to the ill influence of the aberration. Since the optical path converter element 010 has the structure of not generating the aberration within diverging lights, as was mentioned previously, then it is possible to dispose the optical path converter element 010 on the up-route.

In this manner, the optical head 401 comprises the light source 402 for emitting the light beam therefrom, the optical branch element 004 for penetrating the incident light beam therethrough by a predetermined amount thereof and for reflecting the remaining amount of the lights thereupon, the objective lens 007 for focusing the light beam on the optical information recording medium, the photo detector 013 for receiving the light beam reflecting upon the optical information recording medium, and the optical path converter element 010 for converting the angle of the propagating optical path of the light beam. And, in the present embodiment, the optical path converter element 010 is disposed on the optical path between the optical branch element 004 and the light source 402. Also, the optical path converter element 010 has the structure, similar to the embodiment 1, such that the light beam is reflected at different angles at least two (2) times within the optical path converter element, during the time when the light beam passes through a space defines between the incident surface 031 and the emission surface 034.

The light source 402 is connected with a FPC 412, and therefore it is possible to control an amount of lights of the light beam emitting from the light source 402, from an outside of the optical head 401 through the FPC 412.

Also, the photo detector 411 is connected with a FPC 413, and therefore it is possible to transmit a signal obtained from a light receiving surface of the photo detector 411 to an outside of the optical head 401 through the FPC 413.

The light source 402 is made up with a holder 414, in one body or as a unit. The holder 414 has a function of fixing onto the adjustment device when it is assembled, and a heat radiation mechanism of making the radiation of heats, which are generated by the light source 402, easy.

The photo detector 411 is connected with a holder 415, in one body or as a unit. The holder 415 has a function of fixing onto an adjustment device when it is assembled.

Preferably, the light source 402 is disposed to be nearly in parallel with an outer inclination part 020 of the optical head 401. This is because the light source 402 is adjusted as one body together with the holder 414 when assembling, and then, if it is nearly in parallel with the outer shape of the optical head 401, there can be obtained a large effect of preventing the light source 402, the holder 414 and the FPC 412 from being pushed out, due to shifting thereof when assembling.

As was mentioned above, the optical path converter element can be disposed, not only on the down-route, as in the optical head 001, but also on the up-route, as is the optical head 401.

Embodiment 5

Explanation will be given on an embodiment 5, according to the present invention, by referring to attached figures. Herein, explanation will be given on a variation of the optical head 001 according to the embodiment 1.

Figure 12:
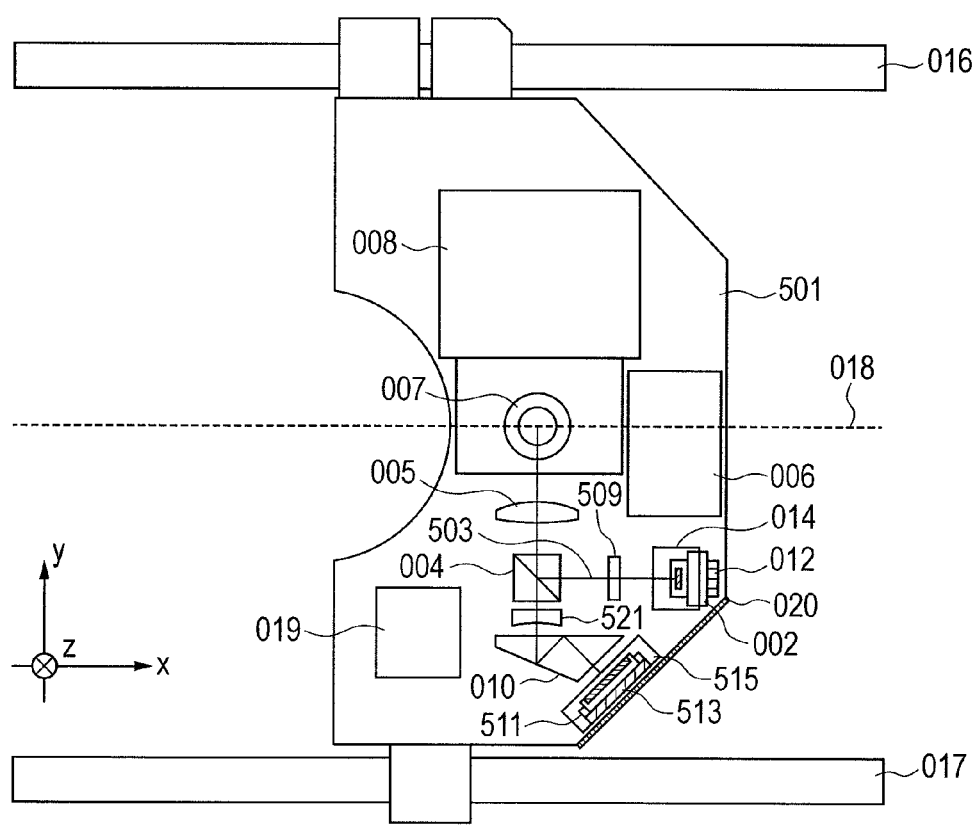
FIG. 12 is a view for showing the structure of the optical head, according to an embodiment 5.

In the embodiment 1, although assuming to apply the method, which is described in the Patent Document 2, in the controls of tracking and/or focusing; however, it differs from that, in an aspect that, in the embodiment 5 are assumed the focusing control of differential astigmatism method and the tracking control of Differential Push Pull (hereinafter, "DPP"). FIG. 12 is an outlook view for showing the structure of an optical head 501, according to the embodiment 5. In the figure, the same reference numerals are attached on the parts, which are not changed the positions thereof in the optical head 001. Also, similar to FIG. 1, this FIG. 12 is a view of the optical head 501, seeing it from the optical disc, i.e., from a side of the 2-layers BD (in the positive direction from the negative z-direction on the paper surface).

From the light source 002 is emitted the light beam having wavelength of about 405 nm, in the form of the divergent pencil of rays. Propagation route of the light beam emitting from the light source 002 is shown by solid lines 503 in the figure.

The light beam emitting from the light source 002 enters or is incident upon the diffraction gating 509. The diffraction gating 509 has a function of dividing the light beam into three (3) pieces, i.e., one (1) piece of main light beam and two (2) pieces of sub light beams, and the three (3) pieces of light beams are used for producing the tracking error signal with the DPP method and the focusing error signal with the differential astigmatism method. However, it should not be limited to the diffraction gating if having the function of dividing the light beam into plural numbers thereof. The light beam passing through diffraction grating 509 enters or is incident upon the optical branch element 004.

The light beam reflecting on the optical branch element 004 is converted into light beams nearly in parallel with, by means of a collimate lens 005.

The light beam propagating through the collimate lens 005, after being converted or changed the propagating direction upon a reflection mirror (not shown in the figure), enters or is incident upon an objective lens 007, and is focused/irradiated on a predetermined information surface of the 2-layers BD.

The light beam reflecting on the predetermined information surface propagates through the objective lens 007, the collimate lens 005 and the optical branch element 004, and then enters onto a detector lens 521. The light beam is given with the astigmatism in a predetermined direction by the detector lens 521, and is used for detecting the focusing error signal of the optical disc with the differential astigmatism method.

The light beam passing through the detector lens 521 enters or is incident upon the optical path converter element 010. The optical path converter element 010 is an optical element for converting or changing an emission direction of the light beam entering thereon, and the light beam entering onto the optical path converter element 010 is converted or changed the emission directions thereof, and is detected on plural numbers of light receiving surfaces, which are provided within a photo detector 511.

However, when treating the 2-layers BD with the DPP method, as the light receiving surface of the photo detector, for reducing the ill influence of interference between stray lights on the light receiving surface for receiving the main light beam and from other layer, there is applied a light receiving surface having a dead zone not detecting the vicinity of a center of the sub light beam. For this reason, the photo detector 511 is assumed to have a light receiving surface for receiving the main light beam and a light receiving surface having the dead zone not detecting the vicinity of a center of the sub light beam.

In the optical head 501, the optical path from the light source 002 up to the 2-layers BD is described, an "up-route", and the optical path from the 2-layers BD down to the photo detector 511, a "down-route", respectively.

The light source 002 is connected with the FPC 012, and therefore it is possible to control an amount of lights of the light beam emitting from the light source 002, from an outside of the optical head 501 through the FPC 012.

Also, the photo detector 511 is connected with a FPC 513, and therefore it is possible to transmit a signal obtained from a light receiving surface of the photo detector 511 to an outside of the optical head 501 through the FPC 513.

The light source 002 is made up with a holder 014, in one body or as a unit. The holder 014 has a function of fixing onto the adjustment device when it is assembled, and a heat radiation mechanism of making the radiation of heats, which are generated by the light source 002, easy.

The photo detector 511 is connected with a holder 515, in one body or as a unit. The holder 515 has a function of fixing onto an adjustment device when it is assembled.

Preferably, the photo detector 511 is disposed to be nearly in parallel with an outer inclination part 020 of the optical head 001. This is because the photo detector 511 is adjusted as one body together with the holder 515 when assembling, and then, if it is nearly in parallel with the outer shape of the optical head 501, there can be obtained a large effect of preventing the photo detector 511, the holder 515 and the FPC 513 from being pushed out, due to shifting thereof when assembling.

As was mentioned above, the optical path converter element is also effective as technology for small-sizing, so as to achieve the thin-type optical head, assuming the focusing control of differential astigmatism method and the tracking control with the DPP method.

However, the present invention should not be limited to the embodiments mentioned above, but may include various variations thereof. For example, the detailed explanation was given on embodiments mentioned above for easy understanding of the present invention, then the present invention should not be restricted to that having all of the constituent elements explained in the above. Also, a part of the structure of any embodiment can be substituted by the structure of other embodiment, and the structure of other embodiment can be added to the structure of a certain embodiment, etc.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical head, comprising:
   a light source, which is configured to emit a light beam therefrom;
   an optical branch element, which is configured to penetrate a predetermined amount of lights, therethrough, of an incident light beam thereon, and to reflecting remaining amount of lights thereupon;
   a light focusing element, which is configured to focus said light beam upon an optical information recording medium;
   a photo detector, which is configured to receive said light beam reflecting upon said optical information recording medium; and
   an optical path converter element, which is configured to convert an angle of an optical path, on which said light beam propagates; wherein
   said optical path converter element is disposed on an optical path of said light beam between said optical branch element and said photo detector, or between said optical branch element and said light source, and has an incident surface, upon which said light beam enters, and an emission surface, from which said light beams emits, so that said light beam reflects at least two (2) times within said optical path converter element, during time when passing through between said incident surface and said emission surface; and
   said optical path converter element is so constructed that an angle defined by said incident surface and the emission surface is smaller than 45 degree.

2. The optical head, as described in the claim 1, wherein
   said optical path converter element is so constructed that said incident surface and the light beam incident upon said incident surface come across, approximately at right angles, and further the emission surface and the light beam emitting from said emission surface come across, approximately at right angles.

3. The optical head, as described in the claim 1, further comprising:
   an optical divider element, which is configured to divide the light beam into plural numbers thereof, wherein
   said optical divider element is disposed on an optical path of said light beam between said optical branch element and said photo detector, or between said optical branch element and said light source.

4. The optical head, as described in the claim 1, wherein
   said photo detector or said light source is disposed to be nearly in parallel with an outer configuration of said optical head.

5. The optical head, as described in the claim 1, wherein
   when said optical head is mounted on at least one shaft for executing recording and/or reproducing onto/from said optical recording medium, a surface for receiving the light beam of said photo detector or an emission surface of the light beam of said light source is disposed to be nearly in parallel with a side surface of an optical drive.

6. An optical head, comprising:
   a first light source, which is configured to emit a first light beam therefrom;
   a second light source, which is configured to emit a second light beam therefrom;
   a first light focusing element, which is configured to focus said first light beam upon an optical information recording medium;
   a second light focusing element, which is configured to focus said second light beam upon an optical information recording medium;
   a first photo detector, which is configured to receive said first light beam reflecting upon said optical information recording medium;
   a second photo detector, which is configured to receive said second light beam reflecting upon said optical information recording medium;
   an optical branch element, which is configured to penetrate a predetermined amount of lights, therethrough, of said first light beam incident thereon, and to reflecting remaining amount of lights thereupon;
   an optical path converter element, which is configured to convert an angle of an optical path, on which said first light beam propagates, wherein
   said first photo detector is disposed outside than said second photo detector in a radial direction of said optical information recording medium, and
   said optical path converter element is disposed on an optical path of said first light beam between said optical branch element and said first photo detector, or between said optical branch element and said first light source; wherein said optical path converter element has an incident surface, upon which said first light beam enters, and an emission surface, from which said first light beams emits, so that said first light beam reflects at least two (2) times within said optical path converter element, during time when passing through between said incident surface and said emission surface; and said optical path converter element is so constructed that an angle defined by said incident surface and the emission surface is smaller than 45 degree.

7. The optical head, as described in the claim 6, wherein said optical path converter element is so constructed that said incident surface and the first light beam incident upon said incident surface come across, approximately at right angles, and further the emission surface and the first light beam emitting from said emission surface come across, approximately.

8. The optical head, as described in the claim 6, further comprising:

an optical divider element, which is configured to divide the light beam into plural numbers thereof, wherein said optical divider element is disposed on an optical path of said light beam between said optical branch element and said first photo detector, or between said optical branch element and said first light source.

9. The optical head, as described in the claim 6, wherein said photo detector or said light source is disposed to be nearly in parallel with an outer configuration of said optical head.

10. The optical head, as described in the claim 6, wherein when said optical head is mounted on at least one shaft for executing recording and/or reproducing onto/from aid optical recording medium, a surface for receiving the light beam of said first photo detector or an emission surface of the light beam of said first light source is disposed to be nearly in parallel with a side surface of an optical drive.

* * * * *